United States Patent
Normand

(10) Patent No.: US 9,972,218 B2
(45) Date of Patent: May 15, 2018

(54) WOUND DEBRIDEMENT MODEL

(71) Applicant: Cari JoAnn Normand, Haughton, LA (US)

(72) Inventor: Cari JoAnn Normand, Haughton, LA (US)

(73) Assignee: Cari Normand

( * ) Notice: Subject to any disclaimer, the term of this patent is extended or adjusted under 35 U.S.C. 154(b) by 189 days.

(21) Appl. No.: 15/165,349

(22) Filed: May 26, 2016

(65) Prior Publication Data

US 2017/0345339 A1    Nov. 30, 2017

(51) Int. Cl.
*G09B 23/28* (2006.01)

(52) U.S. Cl.
CPC .................... *G09B 23/28* (2013.01)

(58) Field of Classification Search
USPC .................. 434/262, 267, 268, 270, 272
See application file for complete search history.

(56) References Cited

U.S. PATENT DOCUMENTS

| | | | | |
|---|---|---|---|---|
| 3,027,655 A * | 4/1962 | Alderson | ............. | G09B 23/32 434/268 |
| 3,852,893 A * | 12/1974 | Smrcka | ............. | G09B 23/32 264/DIG. 14 |
| 4,596,528 A * | 6/1986 | Lewis | ............. | G09B 23/30 434/270 |
| 8,221,129 B2 * | 7/2012 | Parry | ............. | G09B 23/30 434/272 |
| 8,568,147 B2 * | 10/2013 | Kuo | ............. | G09B 23/30 434/262 |
| 9,548,002 B2 * | 1/2017 | Black | ............. | G09B 23/285 |
| 2010/0178644 A1 * | 7/2010 | Meglan | ............. | G06F 19/3437 434/267 |
| 2014/0057236 A1 * | 2/2014 | Meglan | ............. | G09B 23/30 434/268 |

* cited by examiner

*Primary Examiner* — Kurt Fernstrom

(57) ABSTRACT

A wound debridement model for practicing debridement during classroom training. The wound debridement model includes a base comprising a top surface with at least one hole in the top surface of the base, wherein the bottom of the hole is painted red. The model includes a first layer at least partially covering the top surface of the base such that the first layer is built into a ridge around the hole, wherein the first layer is a flesh colored layer. Further, the wound debridement model includes a second layer coated in a portion of the red painted base of the hole, wherein the second layer comprises wax. Further, the wound debridement model includes a third layer, wherein the third layer comprises a yellow stringy and slimy material. Furthermore, the wound debridement model includes a fourth layer covering the third layer. The fourth layer includes a round piece of leather.

19 Claims, 2 Drawing Sheets

WOUND DEBRIDEMENT MODEL

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

FIELD

The present disclosure generally relates to medical devices and models meant for classroom demonstration. Particularly, the present subject matter relates to a wound debridement model with realistic features, to be used as a teaching/practical model, and methods of its manufacture.

BACKGROUND

In the field of wound care that is a medical sub-specialty, wounds with dead tissue are often debrided i.e., dead tissues are removed with a sharp instrument. Debridement is a process whereby medical professionals cut and excise the dead tissue with the goal of cleaning a wound that contains a dead tissue. This is common practice in humans with wounds, but there is no good way to practice this in a classroom setting. Many times, anatomical models are typically used in classroom demonstration, patient education, and training surgeons to perform specific surgical procedures or wound debridement. However, when training health care professional to perform this task, there exist no good model to practice the wound debridement skill, as a human example cannot be used while training.

Presently, there are many synthetic or rubber wound models available in the market. But these are expensive and moreover are not interactive. For example, a Seymour Butts is expensive and is only meant for observation purposes. Such models only show different types of wounds, but they are not intended for debridement as this may ruin the models. Traditional methods of teaching the skill of wound debridement use either an orange as the peel has similar texture to the outer layer of a dead tissue, but that is where the similarities with the dead tissue ends. Another model currently, most instructors or trainers utilize for teaching or practicing debridement is pig's foot as its anatomically realistic, but there is not a good way to create the texture of the dead tissue within the pig's foot. As the traditional models are not realistic. Moreover, oranges and pig's feet are perishable, therefore need to be refrigerated and usually have a short shelf life. Hence, the end user, i.e. the trainee medical professional, does not get an idea of what real tissues and structure would look like.

Therefore, in light of above discussion, there exists need for improved interactive wound models for debridement that are more realistic in nature.

SUMMARY

This Summary is provided to introduce a selection of concepts in a simplified form that are further described below in the Detailed Description. This Summary is not intended to identify key features or essential features of the claimed subject matter, nor it is intended to be used to limit the scope of the claimed subject matter.

An aspect of the present disclosure provides a wound debridement model for practicing debridement during classroom training.

Another aspect of the present disclosure provides a necrotic wound debridement model for practicing debridement.

A yet another aspect of the present disclosure provides an interactive wound debridement model for practicing debridement.

According to an aspect of the present disclosure, there is provided a wound debridement model for practicing debridement during classroom training. The wound debridement model includes a base comprising a top surface. Further, the wound debridement model includes at least one hole in a top surface of the base, wherein a bottom of the at least one hole is painted red. Furthermore, the wound debridement model includes a first layer at least partially covering the top surface of the base such that the first layer is built into a ridge around the at least one hole, wherein the first layer is a flesh colored layer. Further, the wound debridement model includes a second layer coated in a portion of the red painted base of the at least one hole, wherein the second layer comprises wax. Further, the wound debridement model includes a third layer filled over the second layer, wherein the third layer comprises a yellow stringy and slimy material. Furthermore, the wound debridement model includes a fourth layer covering the third layer. The fourth layer includes a round piece of leather.

According to another embodiment of the present disclosure, there is provided a necrotic wound debridement model for practicing debridement. The necrotic wound debridement model includes a cube shaped base including a top surface. The cube shaped base is formed using polystyrene foam, such as, for example, Styrofoam®. The necrotic wound debridement model also includes at least one hole in a top surface of the cube shaped base to simulate a depth of a wound bed. A bottom of the at least one hole is painted red to simulate a healthy wound tissue. The necrotic wound debridement model also includes a first layer at least partially covering the top surface of the cube shaped base such that the first layer is built into a ridge around the at least one hole. The first layer is a flesh colored layer and simulates a callous tissue. The necrotic wound debridement model also includes a second layer coated in a portion of the red painted base of the at least one hole. The second layer simulates a biofilm and includes wax. The necrotic wound debridement model also includes a third layer filled over the second layer. The third layer simulates a slough and includes a yellow stringy and slimy material. The necrotic wound debridement model further includes a fourth layer covering the third layer. The fourth layer simulates a dead tissue and includes a round piece of leather.

According to a yet another aspect of the present disclosure, there is provided an interactive wound debridement model for practicing debridement. The interactive wound debridement model includes a cube shaped base including a top surface. The cube shaped base is formed using polystyrene foam. The interactive wound debridement model also includes at least one hole in the top surface of the cube shaped base to simulate a depth of a wound bed. A bottom of the at least one hole is painted red to simulate a healthy wound tissue. The interactive wound debridement model further includes a first layer at least partially covering the top surface of the cube shaped base such that the first layer is built into a ridge around the at least one hole to simulate callous tissue. The first layer is a flesh colored layer. The interactive wound debridement model further includes a second layer coated in a portion of the red painted base of the at least one hole simulating a biofilm. The second layer includes wax. The interactive wound debridement model further includes a third layer filled over the second layer. The third layer simulates a slough and includes a yellow stringy and slimy material. The interactive wound debridement model further includes a fourth layer covering the third layer. The fourth layer simulates a dead tissue and includes a round piece of leather.

According to another aspect of the present disclosure, there is provided a method for manufacturing a necrotic wound debridement model. The method includes providing a cube shaped base including a top surface, wherein the cube shaped base is formed using polystyrene foam. The method includes creating at least one hole in the top surface of the cube shaped base to simulate a depth of a wound bed. A bottom of the at least one hole is painted red to simulate a healthy wound tissue. Further, the method includes covering the top surface of the cube shaped base at least partially with a first layer such that the first layer is built into a ridge around the at least one hole. The first layer is a flesh colored layer and simulates a callous tissue. Furthermore, the method includes coating a portion of the red painted base of the at least one hole with a second layer. The second layer simulates a biofilm and includes wax. The method also includes filling a third layer over the second layer. The third layer simulates a slough and includes a yellow stringy and slimy material. The method also includes providing a fourth layer to cover the third layer. The fourth layer simulates a dead tissue and includes a round piece of leather.

In one embodiment, the third layer is formed using a material including at least one of a synthetic snow, cotton fibers, stripes of yellow crepe paper, yellow colored fabric paint, rubber cement, liquid sand, yellow slime, and liquid starch.

In one embodiment, necrotic wound debridement model further includes a piece of husk-type material into the cube shaped base, wherein the husk-type material includes corn husks.

In an embodiment, the cube shaped base has a length of 4 inches, a width of 3.5 inches and a height of 2 inches.

BRIEF DESCRIPTION OF THE DRAWINGS

The foregoing summary, as well as the following Detailed Description of preferred embodiments, is better understood when read in conjunction with the appended drawings. For the purposes of illustration, there is shown in the drawings exemplary embodiments; however, the present disclosure is not limited to the specific methods and instrumentalities disclosed. In the drawings.

DETAILED DESCRIPTION

Figure 1:
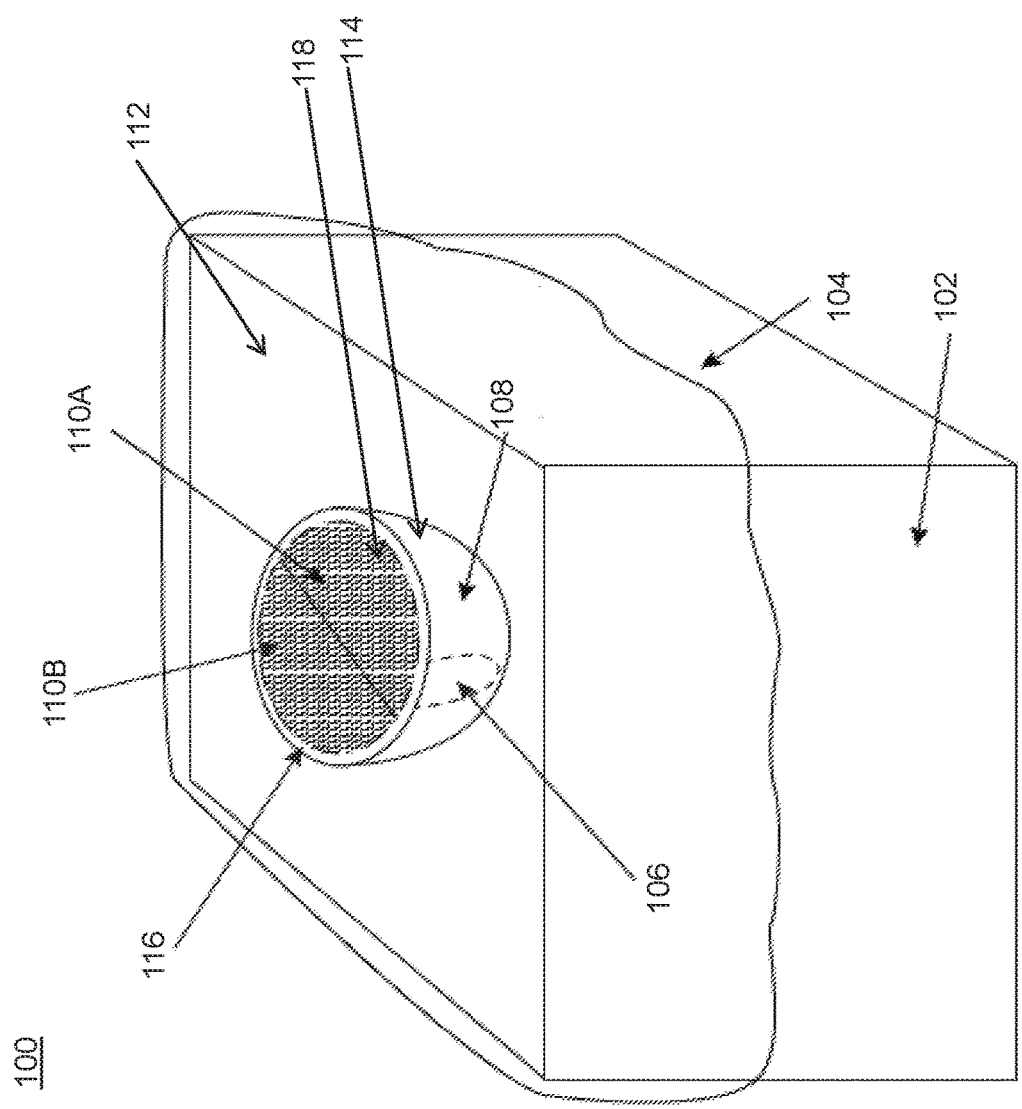
FIG. 1 is a schematic view of an exemplary wound debridement model, in accordance with an embodiment of the present disclosure.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference throughout this specification to "a select embodiment," "one embodiment," or "an embodiment" means that a particular feature, structure, or characteristic described in connection with the embodiment is included in at least one embodiment of the disclosed subject matter. Thus, appearances of the phrases "a select embodiment," "in one embodiment," or "in an embodiment" in various places throughout this specification are not necessarily referring to the same embodiment.

According to an aspect of the present disclosure, there is provided a wound debridement model for practicing debridement during classroom training, including: a base comprising a top surface; at least one hole in the top surface of the base, wherein a bottom of the at least one hole is painted red; a first layer at least partially covering the top surface of the base such that the first layer is built into a ridge around the at least one hole, wherein the first layer is a flesh colored layer; a second layer coated in a portion of the red painted base of the at least one hole, wherein the second layer comprises wax; a third layer filled over the second layer, wherein the third layer comprises a yellow stringy and slimy material; and a fourth layer covering the third layer, wherein the fourth layer comprises a round piece of leather.

According to another embodiment of the present disclosure, there is provided a necrotic wound debridement model for practicing debridement, including: a cube shaped base comprising a top surface, wherein the cube shaped base is formed using polystyrene foam, such as, for example, Styrofoam®; at least one hole in the top surface of the cube shaped base to simulate a depth of a wound bed, wherein a bottom of the at least one hole is painted red to simulate a healthy wound tissue; a first layer at least partially covering the top surface of the cube shaped base such that the first layer is built into a ridge around the at least one hole, wherein the first layer is a flesh colored layer and simulates a callous tissue; a second layer coated in a portion of the red painted base of the at least one hole, wherein the second layer simulates a biofilm and includes wax; a third layer filled over the second layer, wherein the third layer simulates a slough and comprises a yellow stringy and slimy material; and a fourth layer covering the third layer, wherein the fourth layer simulates a dead tissue and comprises a round piece of leather.

According to a yet another aspect of the present disclosure, there is provided an interactive wound debridement model for practicing debridement, including: a cube shaped base comprising a top surface, wherein the cube shaped base is formed using polystyrene foam; at least one hole in the top surface of the cube shaped base to simulate a depth of a wound bed, wherein a bottom of the at least one hole is painted red to simulate a healthy wound tissue; a first layer at least partially covering the top surface of the cube shaped base such that the first layer is built into a ridge around the at least one hole to simulate callous tissue, wherein the first layer is a flesh colored layer; a second layer coated in a portion of the red painted base of the at least one hole simulating a biofilm, wherein the second layer comprises wax; a third layer filled over the second layer, wherein the third layer simulates a slough and comprises a yellow stringy and slimy material; and a fourth layer covering the third layer simulating a dead tissue, wherein the fourth layer simulates a dead tissue and includes a round piece of leather.

According to a yet another aspect of the present disclosure, there is provided a method of manufacturing a necrotic wound debridement model, including: providing a cube shaped base comprising a top surface, wherein the cube shaped base is formed using polystyrene foam; creating at least one hole in the top surface of the cube shaped base to simulate a depth of a wound bed, wherein a bottom of the at least one hole is painted red to simulate a healthy wound tissue; covering the top surface of the cube shaped base at least partially with a first layer such that the first layer is built into a ridge around the at least one hole, wherein the first layer is a flesh colored layer and simulates a callous tissue; coating a portion of the red painted base of the at least one hole with a second layer, wherein the second layer simulates a biofilm and comprises wax; filling a third layer over the second layer, wherein the third layer simulates a slough and comprises a yellow stringy and slimy material; and providing a fourth layer to cover the third layer, wherein the fourth layer simulates a dead tissue and comprises a round piece of leather.

FIG. 1 is a schematic view of an exemplary wound debridement module 100, in accordance with an embodiment of the present disclosure. The wound debridement model 100 is for practicing wound debridement and may be a necrotic wound debridement model and is interactive. The wound debridement model may be used by medical professionals for classroom training or for practical use. For example, the medical or health professional can practice wound debridement on the wound debridement model 100. As shown, the wound debridement module 100 includes a base 102 including a top surface 112. The base 102 can have any suitable shape such as, but not limiting to, cube, cuboid, and so forth. In one embodiment, the base 102 is cube shaped and is formed using suitable material such as, but not limiting to, polystyrene foam. In an embodiment, the base 102 has a length of 4 inches, a width of 3.5 inches and a height of 2 inches.

The wound debridement model 100 also includes at least one hole 108 in the top surface 112 of the base 102. A bottom 114 of the at least one hole 108 is painted red. The bottom 114 is an internal surface of the at least one hole 108. In one embodiment, the at least one hole 108 in the top surface 112 of the base 102 simulates a depth of a wound bed.

The wound debridement model 100 also includes a first layer 104 at least partially covering the top surface 112 of the base 102 such that the first layer 104 is built into a ridge 116 around the at least one hole 108. The first layer 104 may be a flesh colored layer. For example, the polystyrene foam base may be covered with the first layer 104 including clay (flesh or pink colored), sparing an opening of the wound. The clay may be built up into a ridge around the opening of the wound to simulate callous tissue. The callous tissue may be a type of tissue to be debrided by a user such as a medical professional.

The wound debridement model 100 also includes a second layer 106 coated in a portion of the red painted base 114 of the at least one hole 108. The second layer 106 may include wax. The wax or the second layer 106 may cover on inner edge of wound base. The second layer may simulate a biofilm. The simulated biofilm may be often present on the surface of a wound, and the medical professional may utilize another debridement technique to remove this wax or the second layer 106.

The wound debridement model 100 also includes a third layer 118 filled over the second layer 106. The third layer 118 may include a yellow stringy and slimy material. The third layer 118 may simulate a slough. The slough is another specific type of dead tissue. Further, the third layer 118 may be formed using a variety of material including, such as, but not limiting to, a synthetic snow, cotton fibers, stripes of yellow crepe paper, yellow colored fabric paint, rubber cement, liquid sand, yellow slime, liquid starch, or combination of these.

The wound debridement model 100 further includes a fourth layer 110A-110B covering the third layer 118. The fourth layer 110A-110B may include a round piece of leather. The fourth layer 110A-110B may simulate a dead tissue. In an embodiment, the fourth layer 110-110B is a dark colored layer made up of suitable material such as, leather.

In one embodiment, the wound debridement model 100 further includes a piece of husk-type material impeded into the base 102. For example, the husk-type material may include corn husks.

The wound debridement model 100 can be used by companies that manufacture and sell other wound care supplies as it may be good to put in a kit with a scalpel, tweezers, curette and instruction manual.

Further, the wound debridement model 100 can be used by wound physician groups for training. Furthermore, the wound debridement model 100 may be used in hospitals for observation purposes and for practicing. Further, the wound debridement model 100 may be used in classroom settings for example, but not limiting to, medical schools, physical therapy schools, nurse practitioner and physician assistant programs.

The polystyrene foam in the base 102 may work well in the wound debridement model because of its granular nature, and when painted red may closely resemble the real granulation tissue within a wound. The wound debridement model 100 is made to be disposable.

Figure 2:
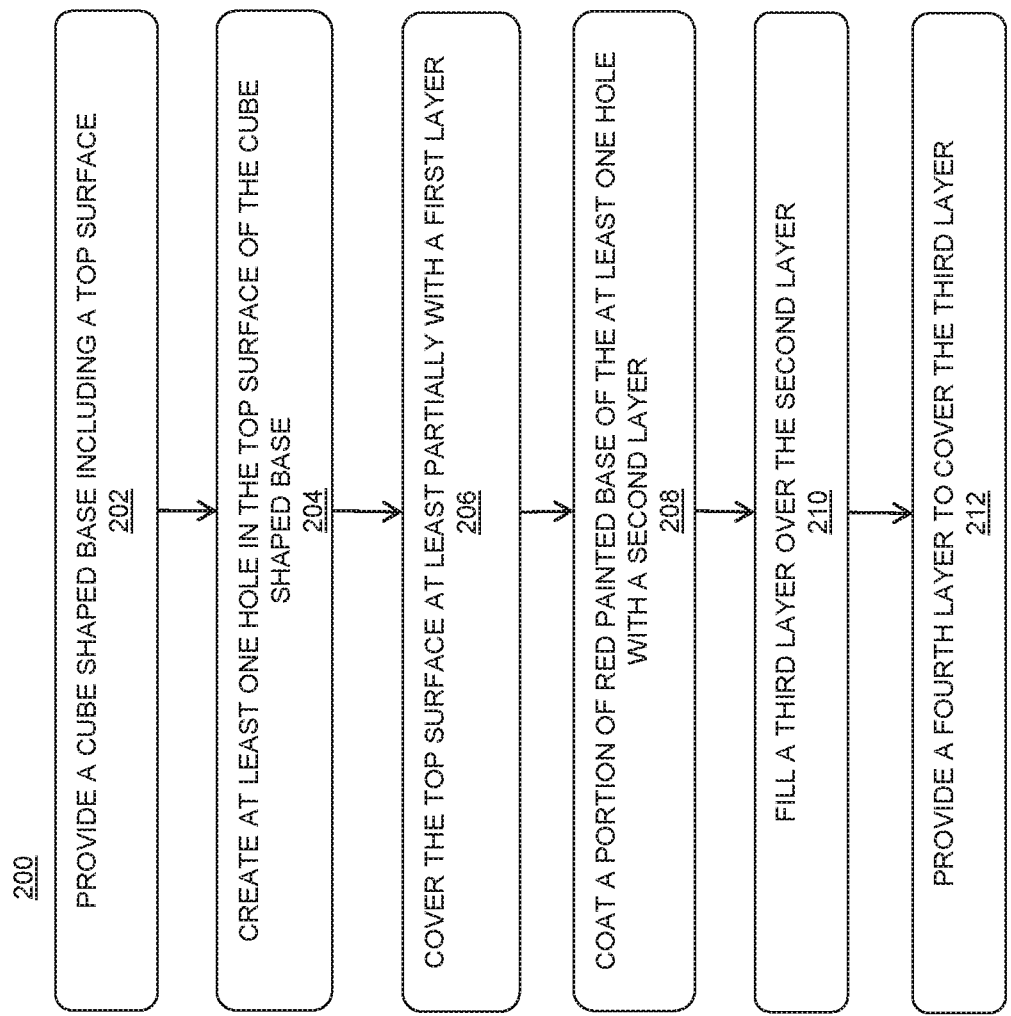
FIG. 2 is a flowchart illustrating a method for manufacturing a wound debridement model, in accordance with an embodiment of the present disclosure.

FIG. 2 is a flowchart illustrating a method 200 for manufacturing a wound debridement model or a necrotic wound debridement model. The method 200 includes providing a cube shaped base including a top surface at step 202. The cube shaped base is formed using polystyrene foam. At step 204, at least one hole in the top surface of the cube shaped base is created to simulate a depth of a wound bed. A bottom of the at least one hole may be painted red to simulate a healthy wound tissue. Then at step 206, the top surface of the cube shaped base is covered at least partially with a first layer such that the first layer is built into a ridge around the at least one hole. The ridge may be a raised edge around the at least one hole. The first layer may be a flesh or pink colored layer and simulates a callous tissue.

Then at step 208, a portion of the red painted base of the at least one hole is coated with a second layer. The second layer simulates a biofilm and may include a suitable material, but not limited to, wax. Then at step 210, a third layer is filled over the second layer. The third layer may simulate a slough and may be formed using a suitable yellow stringy and slimy material. Thereafter, at step 212, a fourth layer is provided to cover the third layer. The fourth layer may simulate a dead tissue and may include a round piece of leather.

The disclosed wound debridement model is a model of a necrotic wound with realistic features. The disclosed wound debridement model can be used as a teaching or practical model.

The disclosed wound debridement model includes a variety of materials including polystyrene foam, clay, paint, leather, glue, as well as a combination of synthetic products to create a realistic substance within a wound.

Further, the disclosed wound debridement model may be made to be disposable and may also be re-used. Furthermore, the wound debridement model may allow interaction and is affordable too as compared to the known rubber-typed wound models. Further, the wound debridement model is non-perishable and may not require refrigeration.

The wound debridement model is configured to be used in a dry and an indoor environment. Also, the disclosed wound debridement model is light-weight and can be used for performing actual wound debridement.

In some embodiment, the wound debridement model may be packaged along with wound treating products, such as, but not limiting to, a scalpel, tweezers, curette, and instruction manual including instructions for using the wound debridement model.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

The invention claimed is:

1. A wound debridement model for practicing debridement during classroom training, the wound debridement model comprising:
   a base comprising a top surface;
   at least one hole in the top surface of the base, wherein a bottom of the at least one hole is painted red;
   a first layer at least partially covering the top surface of the base such that the first layer is built into a ridge around the at least one hole, wherein the first layer is a flesh colored layer;
   a second layer coated in a portion of the red painted base of the at least one hole, wherein the second layer comprises wax;
   a third layer filled over the second layer, wherein the third layer comprises a yellow stringy and slimy material; and
   a fourth layer covering the third layer, wherein the fourth layer comprises a round piece of leather.

2. A wound debridement model of claim 1, wherein the base is cube shaped and is formed using polystyrene foam.

3. The wound debridement model of claim 1, wherein the at least one hole in the top surface of the base simulates a depth of a wound bed.

4. The wound debridement model of claim 3, wherein a bottom of the at least one hole is painted red to simulate a healthy wound tissue.

5. The wound debridement model of claim 1, wherein the second layer simulates a biofilm.

6. The wound debridement model of claim 1, wherein the third layer simulates a slough.

7. The wound debridement model of claim 1, wherein the fourth layer simulates a dead tissue.

8. The wound debridement model of claim 1, wherein the base has a length of 4 inches, a width of 3.5 inches and a height of 2 inches.

9. The wound debridement model of claim 2 further comprising a piece of husk-type material impeded into the base.

10. The wound debridement model of claim 9, wherein the husk-type material comprises corn husks.

11. The wound debridement model of claim 1, wherein the third layer is formed using a material comprising at least one of a synthetic snow, cotton fibers, stripes of yellow crepe paper, yellow colored fabric paint, rubber cement, liquid sand, yellow slime, and liquid starch.

12. A necrotic wound debridement model for practicing debridement, the necrotic wound debridement model comprising:
   a cube shaped base comprising a top surface, wherein the cube shaped base is formed using polystyrene foam;
   at least one hole in the top surface of the cube shaped base to simulate a depth of a wound bed, wherein a bottom of the at least one hole is painted red to simulate a healthy wound tissue;
   a first layer at least partially covering the top surface of the cube shaped base such that the first layer is built into a ridge around the at least one hole, wherein the first layer is a flesh colored layer and simulates a callous tissue;
   a second layer coated in a portion of the red painted base of the at least one hole, wherein the second layer simulates a biofilm and comprises wax;
   a third layer filled over the second layer, wherein the third layer simulates a slough and comprises a yellow stringy and slimy material; and
   a fourth layer covering the third layer, wherein the fourth layer simulates a dead tissue and comprises a round piece of leather.

13. The necrotic wound debridement model of claim 12, wherein the third layer is formed using a material comprising at least one of a synthetic snow, cotton fibers, stripes of yellow crepe paper, yellow colored fabric paint, rubber cement, liquid sand, yellow slime, and liquid starch.

14. The necrotic wound debridement model of claim 12 further comprising a piece of husk-type material into the cube shaped base, wherein the husk-type material comprises corn husks.

15. The necrotic wound debridement model of claim 12, wherein the cube shaped base has a length of 4 inches, a width of 3.5 inches and a height of 2 inches.

16. An interactive wound debridement model for practicing debridement, the interactive wound debridement model comprising:
   a cube shaped base comprising a top surface, wherein the cube shaped base is formed using polystyrene foam;
   at least one hole in the top surface of the cube shaped base to simulate a depth of a wound bed, wherein a bottom of the at least one hole is painted red to simulate a healthy wound tissue;
   a first layer at least partially covering the top surface of the cube shaped base such that the first layer is built into a ridge around the at least one hole to simulate callous tissue, wherein the first layer is a flesh colored layer;
   a second layer coated in a portion of the red painted base of the at least one hole simulating a biofilm, wherein the second layer comprises wax;

a third layer filled over the second layer, wherein the third layer simulates a slough and comprises a yellow stringy and slimy material; and a fourth layer covering the third layer simulating a dead tissue, wherein the fourth layer simulates a dead tissue and comprises a round piece of leather.

17. The interactive wound debridement model of claim 16, wherein the third layer is formed using a material comprising at least one of a synthetic snow, cotton fibers, stripes of yellow crepe paper, yellow colored fabric paint, rubber cement, liquid sand, yellow slime, and liquid starch.

18. The interactive wound debridement model of claim 16 further comprising a piece of husk-type material into the cube shaped base, wherein the husk-type material comprises corn husks.

19. The interactive wound debridement model of claim 16, wherein cube shaped base has a length of 4 inches, a width of 3.5 inches and a height of 2 inches.

* * * * *